United States Patent [19]

Waninger et al.

[11] 4,122,763
[45] Oct. 31, 1978

[54] HOUSEHOLD COFFEE MACHINE WITH CALCIFICATION INDICATOR

[75] Inventors: Rudolf Waninger, Villingen-Schwenningen; Frank Obrowski, Bad Duerrheim, both of Fed. Rep. of Germany

[73] Assignee: Wigo Gottlob Widmann & Soehne GmbH & Co. KG, Villingen-Schwenningen, Fed. Rep. of Germany

[21] Appl. No.: 805,979

[22] Filed: Jun. 13, 1977

[30] Foreign Application Priority Data

Oct. 14, 1976 [DE] Fed. Rep. of Germany ....... 2646312

[51] Int. Cl.² .............................................. A47J 31/58
[52] U.S. Cl. ....................................... 99/281; 340/608
[58] Field of Search ................ 99/281, 282, 283, 285, 99/280; 340/236, 239 R, 243, 227.1

[56] References Cited

U.S. PATENT DOCUMENTS

| 3,430,232 | 2/1969 | Martin | 99/285 |
| 3,443,508 | 5/1969 | Reynolds | 99/285 |
| 3,693,535 | 9/1972 | Abel | 99/285 |

FOREIGN PATENT DOCUMENTS

2,234,661  6/1975  Fed. Rep. of Germany.

*Primary Examiner*—Robert W. Jenkins
*Attorney, Agent, or Firm*—Kenway & Jenney

[57] ABSTRACT

A coffee making machine having a calcification indicator system which turns an indicator device on and off to warn of the presence of calcine deposits in the water flow path of a flow heater is disclosed. The coffee machine calcification indicator system includes a glow lamp in a circuit arrangement with a signal flasher circuit. At least a portion of the calcification indicator system is connected in a parallel circuit arrangement with a heater thermostat switch. A calcification indicator switch is actuated at a time dependent upon the conclusion of the coffee making process to disable the operation of the calcification indicator device.

9 Claims, 2 Drawing Figures

HOUSEHOLD COFFEE MACHINE WITH CALCIFICATION INDICATOR

GENERAL BACKGROUND, OBJECTS AND SUMMARY OF THE INVENTION

The invention relates to a household coffee machine of the type which includes a flow heater fed by a cold water supply and having a hot water outlet, a thermostat for controlling the temperature of the flow heater, and a switch operable to actuate a calcification indicator device.

There exists a household coffee machine, of the type described above, in which the switch for actuating the calcification indicator is a heat actuated switch whose heat detector is arranged at the hot water outlet of the flow heater. In this device, the switch is connected in series with the calcification indicator device, the latter giving a signal before the calcine deposits in the water flow path of the heater reach an inadmissible extent and impair the performance of the appliance. This prior appliance also contains a thermostat switch that interrupts the filament circuit to the flow heater as soon as the heater exceeds a given temperature.

This known coffee machine has a drawback inasmuch as the heat detector of the switch controlling the calcification indicator device is mounted in the hot portion of the line issuing from the flow heater. With this arrangement, after the termination of the water flow through a new appliance, an appliance which is not calcified, or a calcified appliance, steam is generated in the flow heater and flows through the water lines. This steam causes a temperature rise which is detected by the heat detector. In response to this temperature rise, the heat detector may actuate the calcification indicator.

Further, in this known appliance, the flow heater works subsequent to the water heating process as a hot plate or pot warming element. Thus, there exists the risk that the calcification indicator device will also respond during the heat holding period (i.e., the period while the temperature of the coffee pot is being maintained) since the holding temperature of such a flow heater lies substantially above its operating temperature during the water heating process.

For the reasons noted above, no clear calcification indication is assured in the described appliance.

There also exists a coffee machine that consists of a cold water container, a check valve, an electric flow heater, a feedpipe and a filtering device. This other machine also includes a calcification indicator device wherein a differential pressure gage is arranged between the check valve and the outlet of the flow heater and is disposed in a working connection with the calcification indicator device. In this case, the indicator device may be an optical and/or acoustical signaler. Since only a transient or short-term pressure rise in the flow heater is indicated by means of the differential pressure gage, no clear indication of the state of calcification is thereby assured. Moreover, since a pressure rise may appear during operation of the flow heater when it is not calcified, the indicating device can be also actuated when there is no calcification at all.

A principle object of the invention is therefore to provide a household coffee machine of the initially mentioned kind with a calcification indicator system that assures a reliable indication of the state of calcification.

The invention features a household coffee machine having a coffee making cycle and including a flow heater with a cold water supply conduit, a hot water outlet, a thermostat for controlling the temperature of the flow heater, and a calcification indicator switch responsive to a predetermined condition for actuating a calcification indicator device. A calcification indicator system comprises a glow lamp operable in circuit arrangement with a signal flasher. Means are provided to actuate the calcification indicator switch at a time dependent upon the conclusion of the coffee making process for disabling the calcification indicator system. At least a portion of the calcification indicator system is connected in a parallel circuit connection with the thermostat controlling the flow heater. Thus, the thermostat, in a turn-on state, also disables the calcification indicating system.

In preferred embodiments, the actuating means can be a heat detector arranged at the cold water supply of the flow heater. In other embodiments, the actuating means can be a liquid level detector that is dependent on the pressure of the cold water. The switch can also be actuated in response to a temperature-sensitive resistor in the cold water supply.

According to the invention, the state of the thermostat during the water heating process, that is, during the making of the coffee, is used to define the beginning of a time period during which an indication of calcification can be made. The end of the time period coincides substantially with the conclusion of the water heating process. The calcification indicator system is actuated when the flow heater attains, during the water heating process, such a temperature that the thermostat becomes actuated to the "heater off" or "turn-off" state. The calcification indicator switch, which is actuated at a time dependent upon the conclusion of the coffee making period, disables the calcification indicator system after termination of the water heating process so that heating in the flow heater, after the flow water heating process, cannot affect the calcification indication.

In a preferred embodiment of the invention, the signal flasher is a relaxation oscillation circuit. In this embodiment, the calcified state of the appliance is preferably indicated through the periodic flashing of a gas discharge lamp which is preferably part of the oscillator circuit.

DESCRIPTION OF THE DRAWINGS

Other objects, features and advantages of the invention will appear from the following description of a preferred embodiment of the invention taken together with the drawings in which.

DETAILED DESCRIPTION OF THE INVENTION

Figure 1:
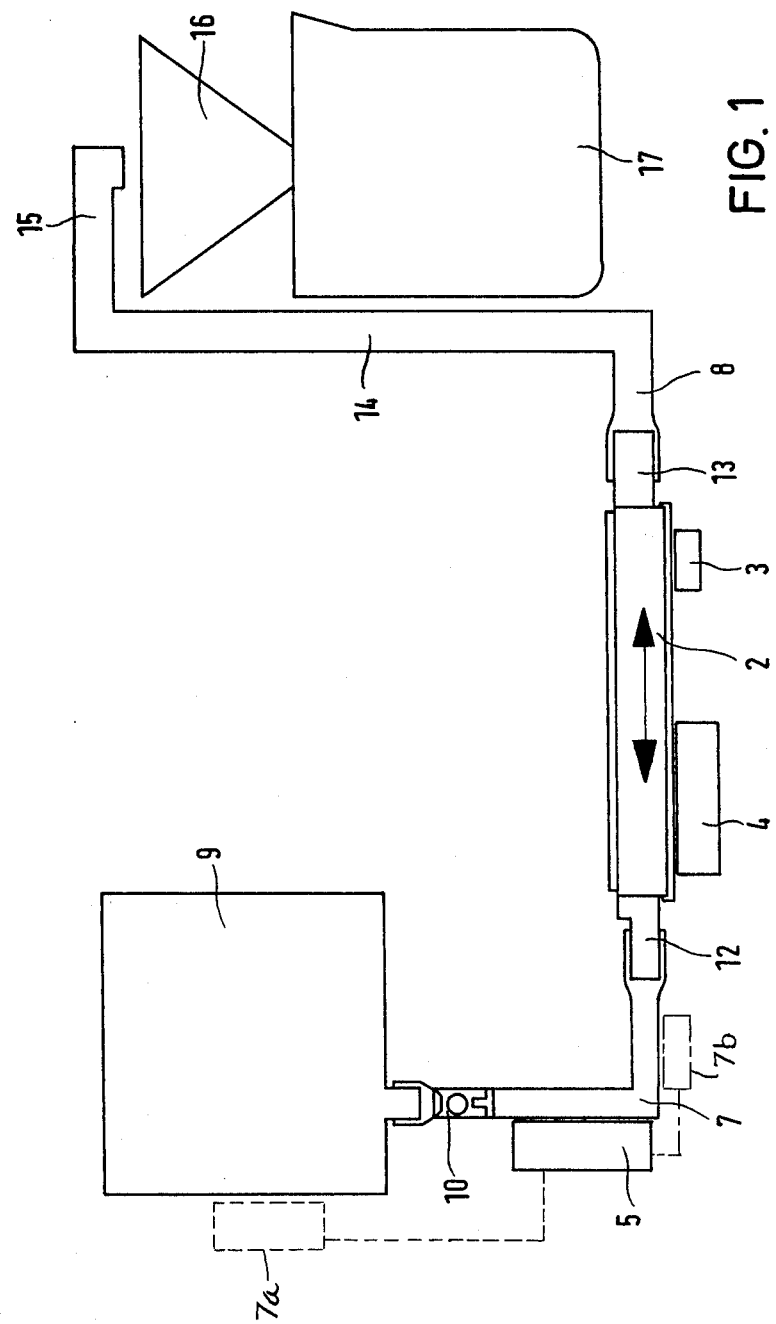
FIG. 1 provides a diagrammatic representation of a household coffee machine in accordance with the invention.

Referring to FIG. 1, a household coffee machine according to the invention comprises a plate-shaped flow heater 2, flow heater 2 having an internal water flow passage and a heating filament which serves to heat water. Heater 2 also acts as a hot plate for heating a coffee jug or pot 17 which, after coffee making is concluded, is set down on the top of the plate-shaped flow heater.

The "holding" or pot heating temperature of the flow heater 2 is kept constant using a heat level responsive switch, thermostat 4. Thermostat 4 is responsive to temperatures in the flow heater. A thermal fuse 3 is connected in series with the thermostat 4 and the heating filament winding of the flow heater 2. This fuse is temperature responsive and protects the appliance in case the thermostat fails.

In the coffee making process, water flows from a fresh water container 9 through a cold water line or conduit 7, via a check valve 10, to a cold water inlet 12 of the flow heater 2. In the flow heater 2, the water is heated and flows through a flow heater outlet 13 to a hot water line or conduit 8, through a standpipe 14, through a water overflow 15, through a coffee-filled filter 16 and into the coffee jug 17.

In the preferred embodiment, the switch opening temperature of the thermostat 4 is so selected that, during the water heating process, the thermostat 4 normally provides a closed path, that is, does not open, unless excessive calcification should be present on the interior flow passage walls of flow heater 2. After prolonged use, and depending on the lime content of the applied water, the water passage of the flow heater 2 becomes calcified, especially in the region of the hot water outlet 13 and the portion of line 8 near this outlet.

Upon the beginning of calcification, there occurs a substantial decrease in heat conductance in flow heater 2, and the temperature of the flow heater rises whereby the thermostat 4 opens during the water heating process. The supply of current to the heating filament of the flow heater is thus cut-off. Because the coffee making cycle is not concluded, a calcification indicator control switch 5 is still open. Under these conditions, thermostat switch and control switch 5 both open, a calcification indicator system, for example, a glow lamp in conjunction with a signal flashing circuit, is enabled to indicate to the user, during the water heating process, that a decalcification of the appliance is required.

The switch 5 is preferably a heat-detector equipped switch which makes a good heat conducting connection with the cold water line 7. In other words, switch 5 is actuated by means disposed in a thermally responsive mounting in association with cold water line 7. The closing temperature of the heat-detector equipped switch 5 lies about 30° above the fresh water temperature so that the contact of switch 5 remains open during the coffee making process. In other embodiments of the invention switch 5 may be actuated by (a) a liquid level responsive means 7a mounted in association with the cold water supply (as indicated by the dotted outline in FIG. 1), (b) means responsive to the pressure in the cold water line 7, (c) a temperature-sensitive resistor 7b (as indicated by the dot-dashed line in FIG. 1), or the like.

As soon as the coffee making process is concluded, the water in the flow heater 2 boils off and steam is generated which simultaneously escapes through the cold water inlet 12 and the hot water outlet 13. The steam causes a temperature rise in the line 7 (as well as line 8) and thus at the heat detector location of switch 5. This temperature rise actuates closure of the contacts of switch 5, and effects "turn-off" or disables operation of the calcification indicator system.

Thereafter, with the coffee filled jug 17 resting on plate 2, heating control is maintained by thermostat 4. The "hot plate" temperature of unit 2, with no water in line 7, will cause switch 5 to remain closed, with pot heating being regulated by thermostat 4.

Figure 2:
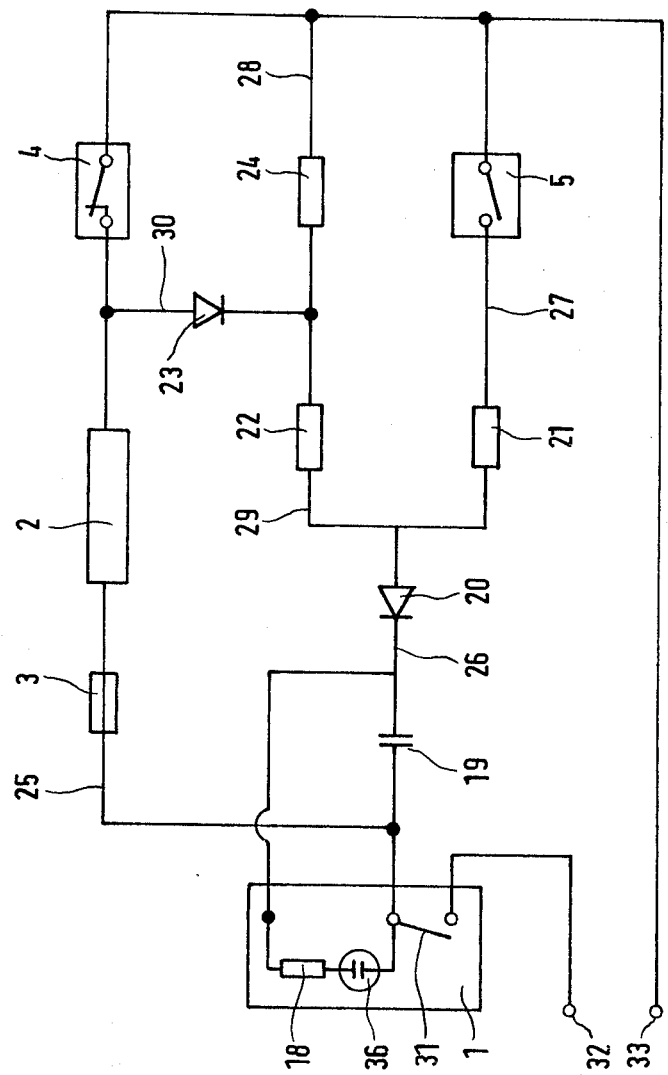
FIG. 2 schematically illustrates the electric wiring diagram of the coffee machine of FIG. 1.

Referring now to FIG. 2, the coffee machine electrical circuit is actuated or turned on by closing a switch assembly 1 which has a main contact switch 31. The switch assembly 1 preferably consists of a transparent material and contains a glow lamp 36 preferably a gas discharge lamp such as a neon bulb, connected in series with a resistor 18. The flow heater 2, the thermal fuse 3 and the thermostat 4 are connected in series with power input lines 32, 33. After main contact switch 31 is closed, and cold water begins to flow into flow heater 2, there also flows a secondary current for the gas discharge lamp 36 in circuit sections 26, 29, 30 (which include the gas discharge lamp 36, the series resistance 18, a diode 20, a resistor 22 and a diode 23). No current flows through circuit section 27 since the switch 5 is open during the water heating process. Thermostat 4 is however closed, i.e., is in a "turn-on" state or condition. A circuit section 28, having a resistor 24, is short-circuited through the closed contact of the thermostat 4.

Assuming that no calcification has taken place, at the conclusion of the water heating process, as noted above, steam is generated in the flow heater 2, which escapes through the hot water outlet 13 into line 8 and through the cold water inlet into line 7. The temperatures of lines 7 and 8 are thereby raised. Through the temperature rise, the heat responsive contact of switch 5 is closed. This occurs before the contact of thermostat 4 opens, that is, before the temperature of flow heater 2 has risen to the temperature at which the thermostat contact opens. Thus, immediately after the conclusion of the water heating process, filament current still flows in the main circuit 25, while the secondary current flows through the parallel paths of circuit sections 26, 29, 30 and 27. (Resistor 21 in circuit 27 has a resistance value comparable to the resistance of resistor 22.) Upon reaching the predetermined cut-off temperature, the contacts of thermostat 4 open and the current through the main circuit 25 is interrupted as the current to the filaments of flow heater 2 is switched off. The secondary current however still flows, but now only through the circuit sections 26 and 27, and the gas discharge lamp 36 continues to be continuously lit.

During the time period when the coffee jug 17 is maintained in a heated condition by the flow heater 2, the contacts of thermostat 4 open and close thereby turning the current to the flow heater filaments off and on, so that the flow heater plate is essentially kept at a constant temperature. The switch 5 remains closed during this period of operation since its opening temperature lies below the ambient temperature in inlet line 7 during the holding phase.

Until now, it has been assumed that there is no calcification of the flow heater. When calcification of the flow heater 2 begins, a substantial reduction of heat conductance occurs so that the thermostat 4 is actuated during the water heating process and interrupts the main circuit 25 during the process. This did not occur when there was no calcification of the flow heater. Since there is no current flow through circuit section 27 during the water heating process (switch 5 is open as a result of the low temperature of the cold water still left in line 7), the secondary current now flows through the circuit sections 26, 29, 28. Thus the secondary current passes through a control resistor 24 having a high resistance value, the resistor 22 which has a low resistance compared to resistor 24, diode 20, resistor 18, the gas discharge lamp 36, and a capacitor 19 arranged parallel to the series connection of resistor 18 and the gas discharge lamp 36. This circuit arrangement forms a signal flasher, a circuit which periodically lights the gas discharge lamp 36. As described, the circuit is a relaxation oscillator.

After the flow heater 2 cools, the contacts of thermostat 4 close and the gas discharge lamp 36 glows again, continuously, until the flow heater again attains the temperature at which thermostat 4 opens.

As described above, switch 5 is a switch actuated by a heat detector. In other embodiments, the switch may be, for example, a liquid level switch, which closes circuit section 27 when the fresh water container is emptied, or a temperature-sensitive switch which drastically reduces, almost suddenly, its resistance at a defined temperature (such building blocks are known under the designation PTC-resistors). Thus, according to the invention, in normal operation, the user switches on the appliance with the switch 1, whereupon the lamp 36 lights up. If the flow heater is not in a calcified state the coffee is made in the well known phases of: filtering the heated water, boiling off in the flow heater, and holding or maintaining the temperature of the coffee pot. During this time, the lamp 36 in switch assembly 1 lights uninterruptedly. If there occurs during the filtering or boiling-off phases a flashing of the lamp 36, this is the first indication that a decalcification should be carried out. The flashing appears, in case of an appliance which is strongly calcified, 2 to 4 times during the coffee making process at intervals of about 25 seconds each.

As will be appreciated, while individual components of the coffee maker described above may be obtained in the form of well known electrical or structural components, the arrangement described is unique.

SUMMARY OF MAJOR ADVANTAGES AND SCOPE OF THE INVENTION

The major advantages of the invention reside in the attainment of a calcification indicator system which will not provide a false calcification indication during the water flow cycle, during the steam generating cycle at the end of water flow, or during the pot warming or "holding" cycle.

However, a reliable indication will be provided during the coffee making process when excessive heating of flow heater 2 occurs (i.e., when calcification prevents water flow from maintaining normal water heating temperatures of flow heater 2 through cooling action).

Specifically, the invention advantageously provides an easily recognizable indication of the need for decalcification which is useful not only in coffee machines of the preferred design and structure, but also in coffee machines of prior designs and structures.

The invention is not limited to the represented exemplified embodiments, but can be modified within the framework of the patent claims.

Thus, those skilled in this art and familiar with the present disclosure will recognize additions, deletions, substitutions, equivalent arrangements, and other modifications falling within the scope of the invention as set forth in the appended claims.

What is claimed is:

1. In a household coffee machine having a coffee making cycle and including
 a flow heater with
  a cold water supply conduit,
  a hot water outlet,
  a thermostat for controlling the temperature of the flow heater, and
 a calcification indicator switch responsive to a predetermined condition for effecting operation of a calcification indicator system,
 the improvement wherein
 the calcification indicator system comprises
  a glow lamp operable in circuit arrangement with a signal flasher circuit, and
  means to actuate said switch at a time dependent on the conclusion of the coffee making cycle for disabling the calcification indicating system, and
 at least a portion of said calcification indicator system being connected in a parallel circuit connection with the thermostat,
 whereby said thermostat, in a turn-on state, disables the calcification indicator system.

2. A household coffee machine according to claim 1, wherein said actuating means is a thermally responsive means disposed in a thermally responsive mounting in association with the cold water supply conduit.

3. A household coffee machine according to claim 1, wherein the switch actuating means is a liquid level responsive means mounted in association with the cold water supply.

4. A household coffee machine according to claim 2, wherein the switch actuating means is a temperature-sensitive resistor.

5. A household coffee machine according to claim 1, wherein the signal flasher circuit is a relaxation oscillator.

6. A household coffee machine according to claim 5, wherein said glow lamp is a gas discharge lamp, and the relaxation oscillator includes
 the gas discharge lamp,
 a series connection of a first, second, and third resistors and a diode, and
 a capacitor connected in parallel with the third resistor and the gas discharge lamp.

7. A household coffee machine according to claim 6, wherein the first resistor is connected in a parallel circuit arrangement with the thermostat as a control resistor.

8. A household coffee machine according to claim 6, wherein said switch is connected in series with a fourth resistor and said series circuit of said switch and said fourth resistor is connected in parallel with said first and second resistors.

9. In a household coffee machine having a coffee making cycle and including
 a flow heater with
  a cold water supply conduit,
  a hot water outlet, and
  a thermostat for controlling the temperature of the flow heater, and
 a calcification indicator switch responsive to a predetermined condition for effecting operation of a calcification indicator system,
 the improvement wherein
 the calcification indicator system comprises
  a glow lamp operable in circuit arrangement with a signal flasher circuit,
  means to connect said switch through a low resistance path in a parallel circuit arrangement with said thermostat, and
  means to actuate said switch at a time dependent on the conclusion of said coffee making process for disabling the indicator system, and
 at least a portion of said indicator system being connected in a parallel circuit arrangement with said thermostat,
 whereby said thermostat, in a turn-on state, disables the calcification indicator system.

* * * * *